United States Patent
Kato et al.

(10) Patent No.: US 9,810,320 B2
(45) Date of Patent: Nov. 7, 2017

(54) VEHICLE CONTROL SYSTEM

(71) Applicant: TOYOTA JIDOSHA KABUSHIKI KAISHA, Toyota-shi, Aichi-ken (JP)

(72) Inventors: Tsubasa Kato, Susono (JP); Seiji Kuwahara, Susono (JP); Satoshi Yamanaka, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/134,889

(22) Filed: Apr. 21, 2016

(65) Prior Publication Data

US 2016/0312889 A1    Oct. 27, 2016

(30) Foreign Application Priority Data

Apr. 23, 2015    (JP) .................. 2015-088039

(51) Int. Cl.
| | |
|---|---|
| *F16H 61/66* | (2006.01) |
| *F16H 59/20* | (2006.01) |
| *B60W 10/04* | (2006.01) |
| *B60W 10/101* | (2012.01) |
| *B60W 30/18* | (2012.01) |
| *F16H 61/662* | (2006.01) |

(52) U.S. Cl.
CPC .............. *F16H 61/66* (2013.01); *B60W 10/04* (2013.01); *B60W 10/101* (2013.01); *B60W 30/18009* (2013.01); *F16H 61/66259* (2013.01); *F16H 59/20* (2013.01); *F16H 2061/6611* (2013.01); *F16H 2061/6615* (2013.01)

(58) Field of Classification Search
CPC .. F16H 61/66; F16H 2061/6615; F16H 59/20; B60W 10/04; B60W 10/101
See application file for complete search history.

(56) References Cited

U.S. PATENT DOCUMENTS

| | | | |
|---|---|---|---|
| 5,558,596 A | 9/1996 | Adachi et al. | |
| 6,027,425 A * | 2/2000 | Sakaguchi | B60W 10/06 477/111 |
| 6,800,049 B2 * | 10/2004 | Leising | B60W 10/02 477/39 |
| 6,837,825 B2 * | 1/2005 | Nakayama | F16H 61/66259 477/48 |

FOREIGN PATENT DOCUMENTS

| | | |
|---|---|---|
| JP | H04-185957 A | 7/1992 |
| JP | 2005-170280 A | 6/2005 |
| JP | 2008-202678 A | 9/2008 |
| JP | 2013-068272 A | 4/2013 |

* cited by examiner

*Primary Examiner* — Sherry Estremsky
(74) *Attorney, Agent, or Firm* — Andrews Kurth Kenyon LLP

(57) ABSTRACT

A vehicle control system is provided to improve a response and an acceleration feel of a vehicle having a continuously variable transmission. The vehicle control system is configured to control an output power of a prime mover and a speed ratio of a transmission in such a manner that an actual driving force is increased stepwise to the required driving force to be achieved by a kick-downshifting so as to temporarily hold an increase in an acceleration during execution of the kick-downshifting.

4 Claims, 6 Drawing Sheets

VEHICLE CONTROL SYSTEM

CROSS REFERENCE TO RELATED APPLICATIONS

The present invention claims the benefit of priority to Japanese Patent Application No. 2015-088039 filed on Apr. 23, 2015 with the Japanese Patent Office, the entire contents of which are incorporated herein by reference in its entirety.

BACKGROUND

Field of the Invention

Embodiments of the present invention relates to the art of a control system for a vehicle having a continuously variable transmission, and especially to a vehicle control system configured to control speed ratio and driving force during downshifting of the continuously variable transmission.

Discussion of the Related Art

JP-A-2008-202678 describes a speed limiting device for a vehicle configured to limit vehicle speed upon exceedance of predetermined limit speed. The speed limiting device taught by JP-A-2008-202678 is provided with a kick-down switch for determining a fact that an accelerator pedal is depressed to a kick-down position. According to the teachings of JP-A-2008-202678, when kick-down is determined by the kick-down switch in speed limiting operation and a required throttle opening is larger than an actual throttle opening, the speed limit operation is cancelled, and shifting to a gear stage several stages lower from a present gear stage is inhibited. According to the teachings of JP-A-2008-202678, therefore, an abrupt downshifting can be prevented unless the required throttle opening is smaller than an actual throttle opening even if a kick-down is executed.

JP-A-2005-170280 describes a controller for a vehicle having a continuously variable transmission that is configured to prevent a temporal drop in a driving force resulting from an excessive speed change rate during accelerating the vehicle by a kick-down. To this end, the controller taught by JP-A-2005-170280 is configured to calculate a requested gear shift speed to change a gear ratio to achieve a target driving force. If the calculated requested gear shift speed is faster than a predetermined limit speed during a kick-down, the gear shift speed is limited to the limit speed and a fuel injection amount to an engine is set based on the requested gear shift speed and the limited gear shift speed. That is, according to the teachings of JP-A-2005-170280, the gear shift speed is limited to the limit speed during kick-down to moderate a downshifting operation while increasing the fuel injection amount to the engine to increase an engine power. For this reason, an unintentional temporal drop in a driving force can be prevented.

JP-A-2013-68272 describes a control apparatus for a vehicle having an automated manual transmission configured to increase a drive torque while suppressing a wheel slip when kick-down is performed. According to the teachings of JP-A-2013-68272, a shift stage (required shift stage) to be selected among a plurality of shift stages is decided on the basis of a traveling condition of the vehicle, and a shift stage of a transmission is controlled to the current required shift stage. If the required shift stage is moved to the low speed side by two stages or more while a wheel slip is not detected, a skip shift is carried out to shift the stage of the transmission from "a required shift stage before change" to "a required shift stage after change". By contrast, if the required shift stage is moved to the low speed side by two stages or more while the wheel slip is detected, the skip shift is not performed, and the shift stage of the transmission is sequentially changed more than once by one stage from "a required shift stage before change" to "a required shift stage after change".

In the conventional vehicle having a continuously variable transmission, a downshifting and an upshifting are carried out by varying a speed ratio gradually and continuously. If a kick-down described in the above-mentioned prior art documents is performed in this kind of vehicle, a speed ratio is changed significantly in such a manner to increase a driving force. In this situation, however, a power of a prime mover is consumed to increase a rotational speed of an inertial member of the engine or the continuously variable transmission. That is, a power loss occurs inevitably during execution of the kick-down, and such power loss is increased with an increase in a variation width of the speed ratio. In addition it takes longer time to achieve a desired driving force or acceleration if such power loss occurs. Thus, if the kick-down is performed in the vehicle having the continuously variable transmission, long time is required to achieve the desired acceleration or driving force and hence response and acceleration feel are worsened.

SUMMARY

Aspects of the present application have been conceived noting the foregoing technical problems, and it is therefore an object of the present application is to provide a vehicle control system configured to improve a response or an acceleration feel of a vehicle having a continuously variable transmission.

The present invention relates to a vehicle control system that is applied to a vehicle having a continuously variable transmission for delivering an output power of a prime mover to a driveshaft. The vehicle control system is configured to detect an execution of a kick-down operation by a driver to increase an opening degree of an accelerator abruptly, and to control a speed ratio of the continuously variable transmission in such a manner as to achieve a required driving force based on the opening degree of the accelerator. In order to achieve the above-explained objective, according to the preferred example, a controller of the vehicle control system is configured to control the output power and the speed ratio in such a manner that an actual driving force is increased stepwise to the required driving force to be achieved by the kick-down operation, so as to temporarily hold an increase in an acceleration during execution of the kick-down operation.

In a non-limiting embodiment, the controller is further configured to increase the actual driving force stepwise in such a manner that the acceleration is held for a longer period of time from a point at which the acceleration is held, if the acceleration is held at a higher magnitude.

In a non-limiting embodiment, the controller is further configured to select a pattern to increase the actual driving force stepwise from a plurality of patterns in such a manner that a total required time to achieve the required driving force by the kick-down operation is shortest.

In a non-limiting embodiment, the controller is further configured to increase the actual driving force in at least two steps, and to set a period of time to hold an increase in the acceleration at a step after a first step shorter than that at the first step.

Thus, according to the preferred embodiment, the driving force is increased stepwise during execution of the kick-downshifting in the vehicle having a continuously variable transmission. According to the preferred embodiment, therefore, the speed ratio of the continuously variable transmission will not be changed significantly in an initial phase of the kick-downshifting to reduce an inertial loss. For this reason, the driving force can be increased promptly so that response of the vehicle and acceleration feel can be improved.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Hereinafter, preferred embodiment of the present application will be explained with reference to the accompanying drawings. The vehicle control system according to the preferred embodiment is applied to a vehicle having an automatic transmission such as a continuously variable transmission adapted to deliver an engine power to driving wheels while changing a speed. For example, a belt-driven continuously variable transmission and a toroidal continuously variable transmission adapted to change a speed ratio continuously can be used in the vehicle to which the vehicle control system is applied. The vehicle control system may also be applied to a hybrid vehicle having a power distribution device for distributing and synthesizing powers of an engine and a motor such as an electric continuously variable transmission.

Figure 1:
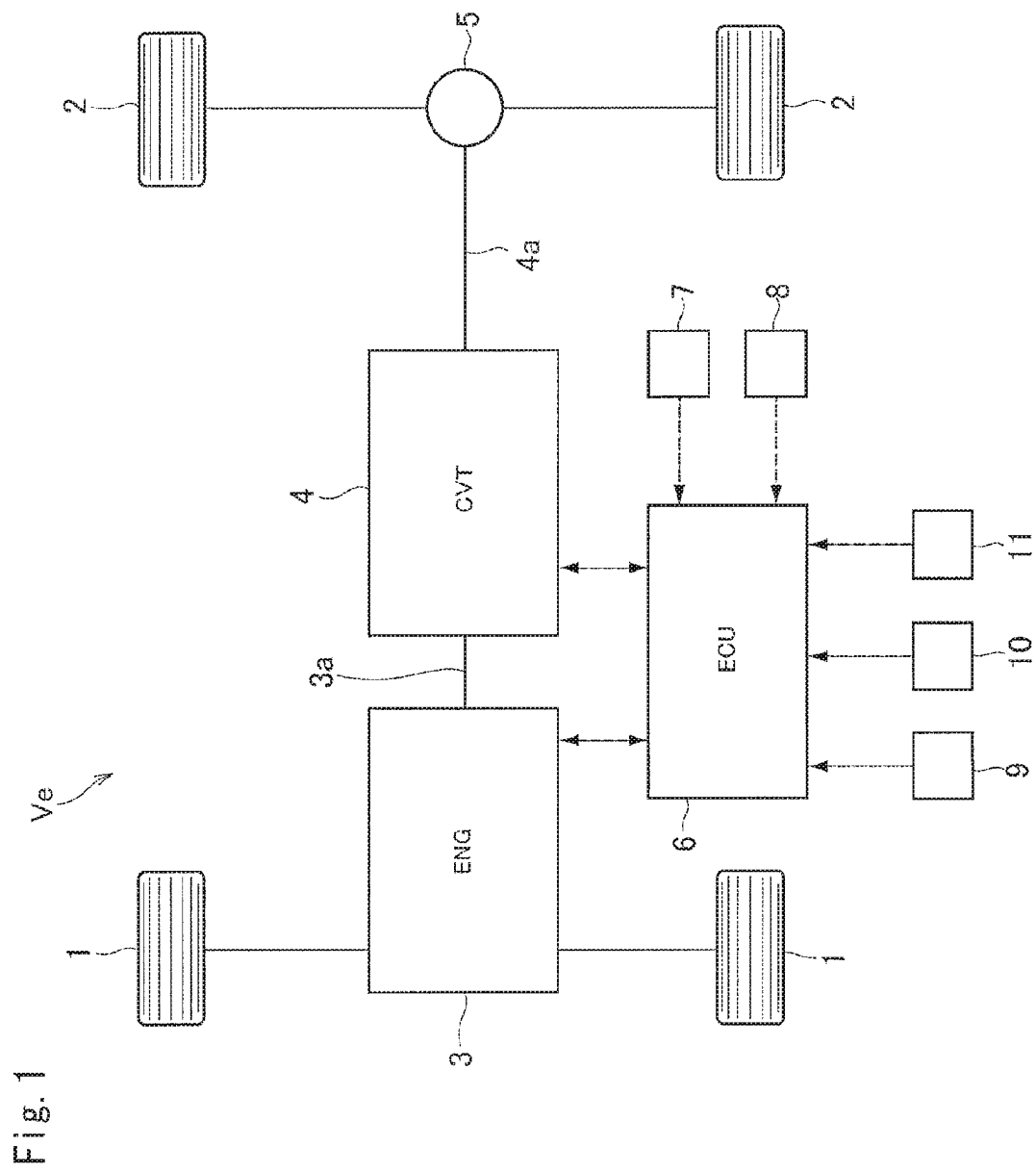
FIG. 1 is a schematic illustration showing the control system of the vehicle to which the vehicle control system according to the preferred embodiment is applied.

Referring now to FIG. 1, there is shown a structure and a control system of a vehicle Ve to which the vehicle control system according to the preferred embodiment is applied. The vehicle Ve shown in FIG. 1 is a rear-wheel-drive vehicle comprising a pair of front wheels 1 and a pair of rear wheels 2. In the vehicle Ve, power of an engine (referred to as "ENG" in FIG. 1) 3 is delivered to the rear wheels 2 through a continuously variable transmission (referred to as "CVT" in FIG. 1) 4 and a differential gear unit 5. Here, it is to be noted that the vehicle control system may also be applied to a front-wheel-drive vehicle in which power of the engine 3 is delivered to the front wheels 1, and to a four-wheel-drive vehicle in which power of the engine 3 is delivered to both front wheels 1 and rear wheels 2.

Although not shown in FIG. 1, the engine 3 is provided with an electric throttle valve, an electric fuel injection device, an airflow sensor for detecting an air intake and so on. According to the preferred embodiment, therefore, an output power of the engine 3 may be controlled automatically by electrically controlling the electric throttle valve based on detection data of the airflow sensor.

The continuously variable transmission 4 is connected to an output side of the engine 3 to deliver an output torque of the engine 3 to driving wheels while changing a speed. For example, a belt-driven continuously variable transmission adapted to change a speed ratio by changing an effective diameter radius of a driving belt running between pulleys may be used as the continuously variable transmission 4.

In order to control an output power of the engine 3 and a sped change operation of the continuously variable transmission 4, the vehicle Ve is provided with a controller (referred to as "ECU" in FIG. 1) 6 as an electronic control unit composed mainly of a microcomputer. Although only one controller is depicted in FIG. 1, a plurality of controllers 9 may be arranged in the vehicle Ve to control the above-mentioned devices individually.

Detection signals and information from sensors and on-board units are sent to the controller 6. To this end, specifically, the controller 6 is connected to an accelerator sensor 7 for detecting an opening degree of an accelerator, a brake sensor (or switch) 8 for detecting a depression of a brake pedal, an engine speed sensor 9 for detecting a speed of an output shaft 3a of the engine 3, an output speed sensor 10 for detecting a speed of an output shaft 4a of the continuously variable transmission 4, and a vehicle speed sensor 11 for detecting rotational speeds of the front wheels 1 and the rear wheels 2. The controller 6 carries out calculations based on the incident data from those sensors and preinstalled data, and calculation results are sent in the form of command signal.

In the vehicle Ve having the continuously variable transmission 4, an inertial loss is caused inevitably by an inertia moment of the continuously variable transmission 4 itself during performing a kick-down to change a speed ratio significantly. Consequently, it takes longer time to achieve a desired driving force or acceleration and hence a response to change in driving force and an acceleration feel may be worsened.

In order to improve a response to change in driving force and an acceleration feel, the controller 6 is configured to increase a speed ratio stepwise during execution of kick-down. Such control will be explained in more detail with reference to FIG. 2.

Figure 2:
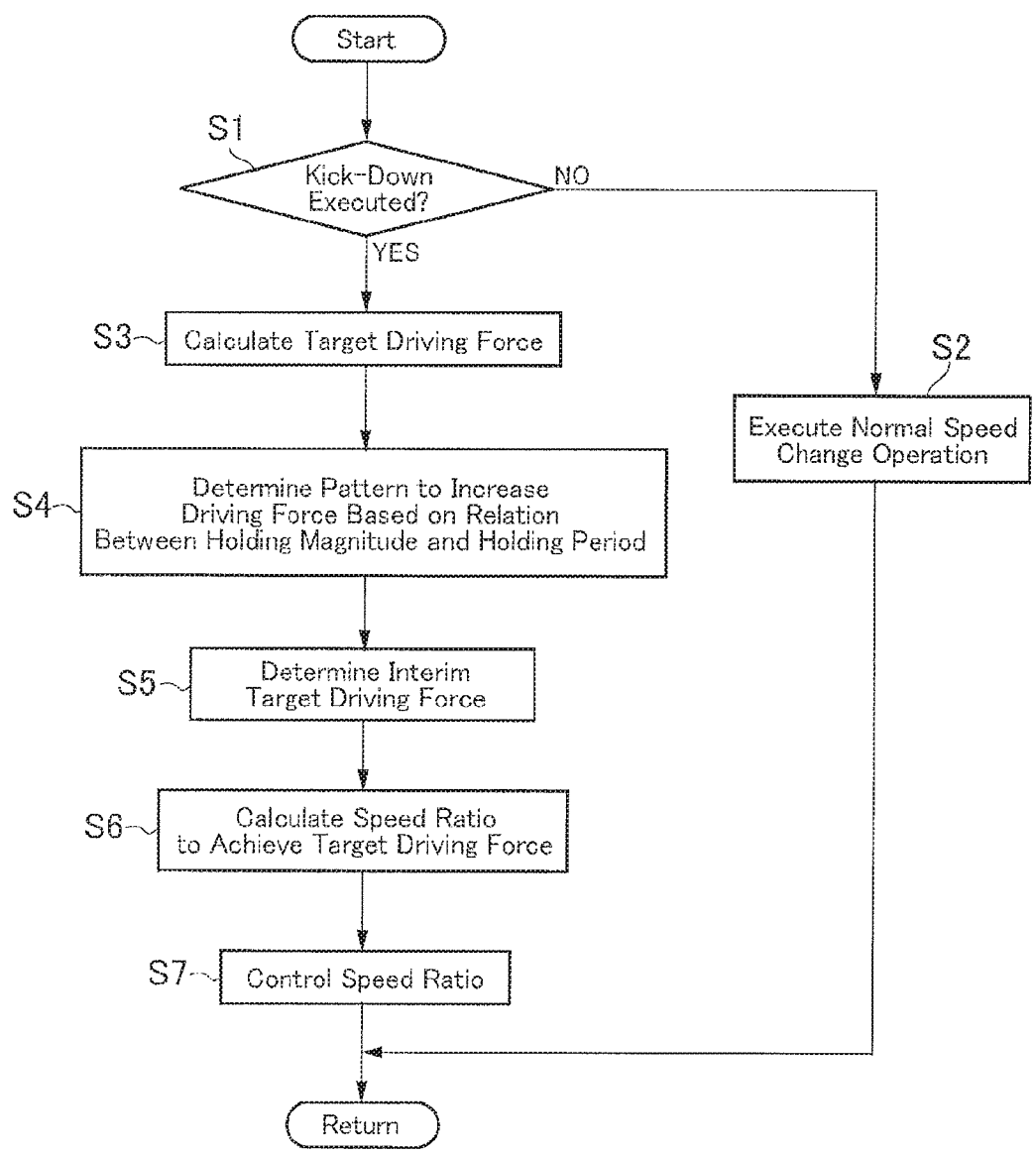
FIG. 2 is a flowchart showing a control example carried out by the vehicle control system according to the preferred embodiment.

The routine shown in FIG. 2 is repeated at predetermined short interval. First of all, an execution of kick-down is determined at step S1 based on detection data from the accelerator sensor 7. Specifically, an execution of kick-down can be determined based on a fact that the accelerator pedal is depressed deeper than a predetermined angle, or based on a fact that the accelerator pedal is depressed deeper than the predetermined angle at a speed higher than a predetermined speed. Optionally, the kick-down switch taught by JP-A-2008-202678 may be used to determine an execution of kick-down.

If the kick-down is not currently executed so that the answer of step S1 is NO, the routine advances to step S2 to carry out a normal speed change operation and the routine is returned without carrying out any specific controls.

By contrast, if the kick-down is executed so that the answer of step S1 is YES, the routine advances to step S3 to calculate a target driving force to be achieved after a completion of the kick-down shifting by increasing an actual driving force stepwise in such a manner as to curb the rise in acceleration temporarily. At step S3, specifically, the target driving force is calculated based on an opening degree of the accelerator and a vehicle speed achieved as a result of the kick-down. Here, it is to be noted that the acceleration is increased proportionally to an increase in the driving force.

Figure 3:
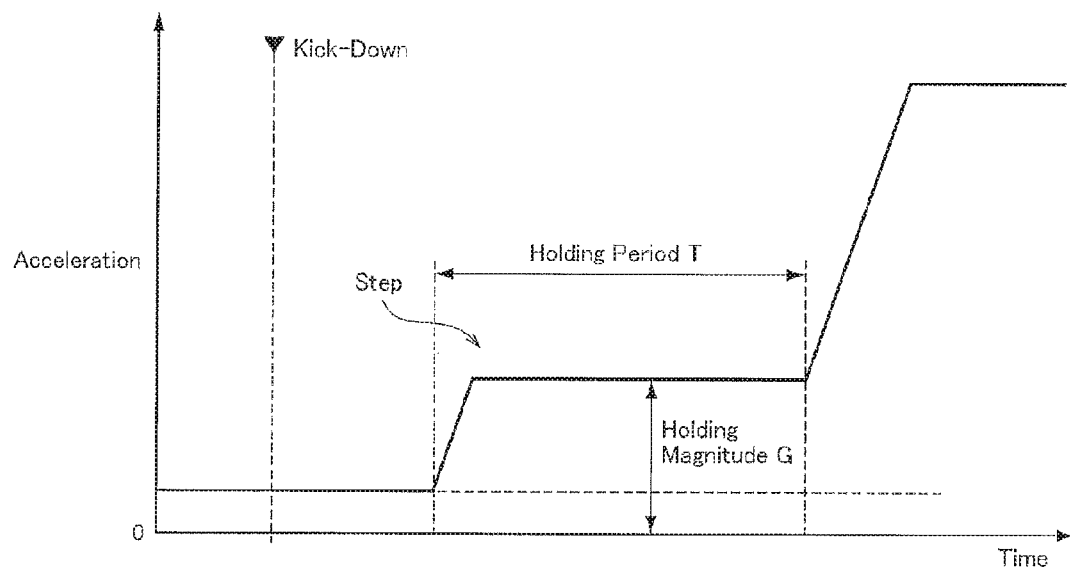
FIG. 3 is a graph indicating the holding period and the holding magnitude of acceleration.

Then, at step S4, a pattern of steps to increase the driving force is determined based on a relation between a holding period for holding the driving force to be increased and a magnitude to hold the acceleration during the holding period. According to the preferred embodiment, the controller 6 controls a speed ratio of the continuously variable transmission 4 in such a manner that the driving force is increased stepwise to curb the rise in acceleration temporarily during the kick-down shifting. Specifically, as indicated in FIG. 3, the kick-down shifting is carried out in such a manner that the acceleration is raised to a holding magnitude and then maintained substantially constant for the duration of the holding period T.

Figure 4:
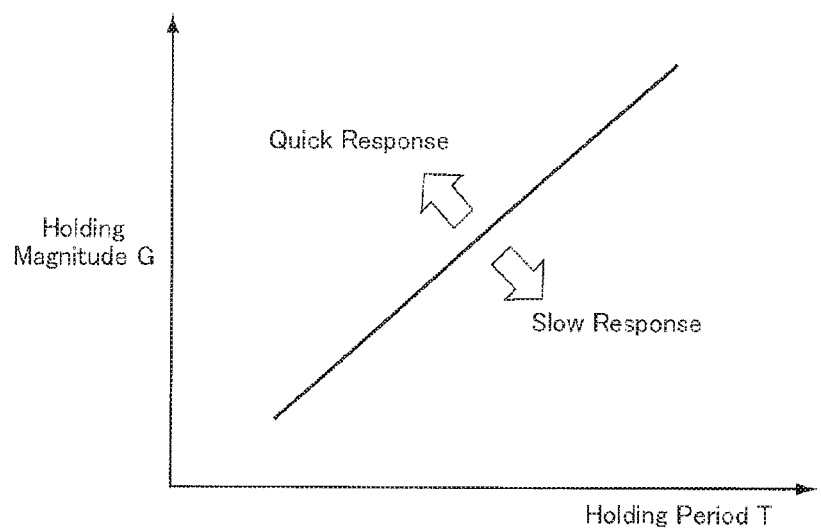
FIG. 4 is a graph indicating a relation between the holding period and the holding magnitude.

The relation between the holding period T for holding the driving force to be increased and the magnitude G at which the acceleration is held for the duration of the holding period T is indicated in FIG. 4. In FIG. 4, a response to increase in the driving force is improved if an inclination of the diagonal line is steeper. That is, the driving force can be increased more promptly by reducing the holding period T. This means that a response to increase in the driving force during the kick-down shifting can be improved by holding the acceleration at a greater magnitude while increasing a speed ratio of the continuously variable transmission 4. However, if the speed ratio of the continuously variable transmission is changed over wider range, longer time is required to achieve a desired acceleration by the kick-down shifting due to inertial loss caused by an inertia moment of rotary members of the continuously variable transmission 4 and the engine 3. In order to avoid such disadvantage, the controller 6 executes kick-downshifting in such a manner as to increase the speed ratio of the continuously variable transmission 4 multiple times to achieve the desired acceleration. That is, according to the preferred embodiment, the speed ratio of the continuously variable transmission 4 will not be increased significantly at once during the kick-down shifting.

In order to increase the driving force stepwise, the speed ratio of the continuously variable transmission 4 is fixed to a predetermined ratio for a predetermined holding period T during the kick-down shifting. That is, acceleration being increased is held constantly at the holding magnitude G for the duration of the holding period T. To this end, according to the preferred embodiment, the speed ratio of the continuously variable transmission 4 may be fixed at desired points. That is, a pattern to increase the driving force stepwise may be selected from a plurality of patterns in such a manner as to improve acceleration feel based on a result of experimentation or simulation while taking account of an engine torque, a response of the continuously variable transmission 4, an inertial loss etc. In order to determine the most suitable pattern to increase the driving force, a map or formula to determine the pattern to increase the driving force prepared based on a result of experimentation or simulation is installed in the controller 6.

Figure 5:
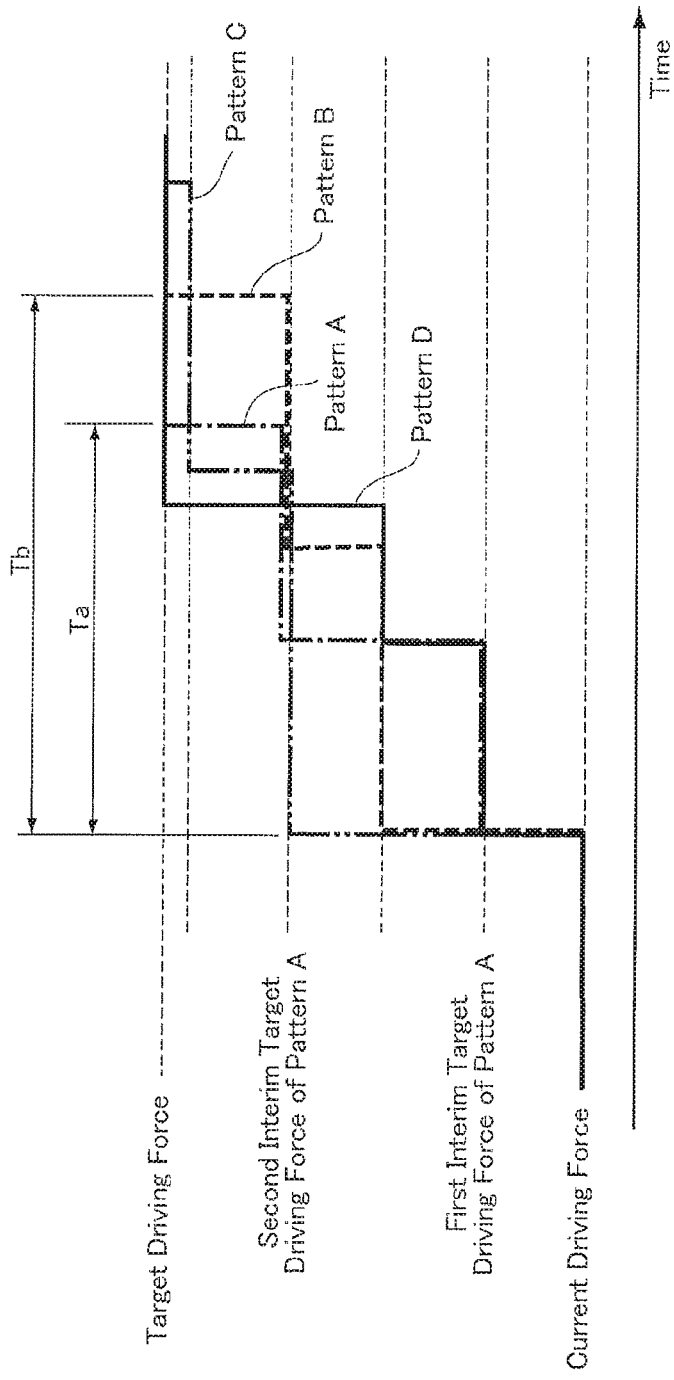
FIG. 5 is a view indicating patterns to increase the driving force stepwise.

Turning to FIG. 5, there is shown an example of the patterns to increase the driving force stepwise. According to the preferred embodiment, several effective patterns to increase the driving force stepwise are determined based on a result of experimentation or simulation while taking account of an engine torque, a response of the continuously variable transmission 4, an inertial loss etc. For example, the effective patterns to increase the driving force stepwise are determined in such a manner as to reduce the holding period T to a minimum period to hold the acceleration, and to achieve the required driving force within an allowable period of time. In the example shown in FIG. 5, four patterns to increase the driving force stepwise are determined. In FIG. 5, specifically, pattern A is represented by the dashed-dotted line, pattern B is represented by the dashed line, pattern C is represented by the dashed-two-dotted line, and pattern D is represented by the solid line. For example, if the pattern A and the pattern B are selected as the suitable patterns, a total required time Ta of the pattern A to achieve the required driving force by the kick-downshifting and a total required time Tb of the pattern B to achieve the required driving force by the kick-downshifting are compared to each other. If the total required time Ta of the pattern A is shorter than the total required time Tb of the pattern B, the pattern A is selected.

Thus, according to the preferred embodiment, the pattern in which the total required time to complete the kick-downshifting is selected to achieve the required driving force. According to the preferred embodiment, therefore, response of the vehicle and acceleration feeling during the kick-downshifting can be improved.

Turning back to FIG. 2, after selecting the pattern of steps to increase the driving force at step S4, an interim target driving force(s) is/are determined at step S5 based on the selected pattern. For example, if the pattern A is selected, there are two steps to increase the driving force in pattern A and hence a first interim target driving force and a second interim target driving force are determined at step S5.

Then, at step S6, speed ratios of the continuously variable transmission 4 to achieve the interim target driving force(s) and the target driving force are calculated individually. In this case, the speed ratios required to achieve the first interim target driving force, the second interim target driving force and the final target driving force are calculated.

Thereafter, at step S7, the speed ratio of the continuously variable transmission 4 is controlled in line with the calculated values to increase the actual driving force stepwise in line with the selected pattern. Then, the routine is returned.

Figure 6:
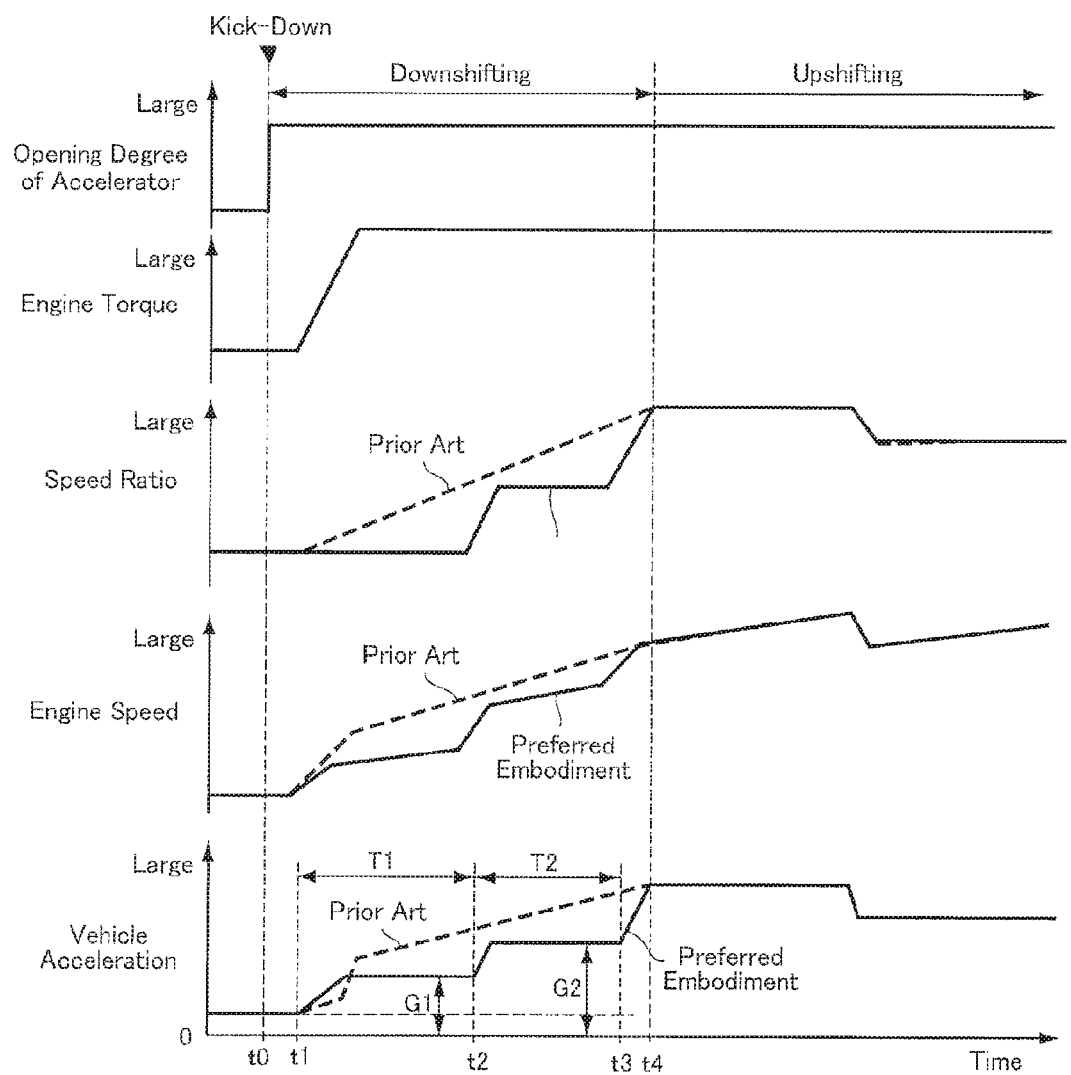
FIG. 6 is a time chart indicating temporal changes in speed ratio, acceleration etc. during execution of the control shown in FIG. 2.

Temporal changes in the speed ratio of the continuously variable transmission 4 and the acceleration of the vehicle Ve during execution of the control shown in FIG. 2 are indicated in FIG. 6. In FIG. 6, changes in the speed ratio, the engine speed and the acceleration during the conventional control are indicated by dashed line, and the kick-down is performed at point to. As can be seen from FIG. 6, according to the conventional control, the speed ratio of the continuously variable transmission is increased linearly after the commencement of the kick-downshifting. By contrast, according to the preferred embodiment, the speed ratio of the continuously variable transmission 4 is increased stepwise as indicated by the solid line.

According to the preferred embodiment, specifically, the acceleration of the vehicle Ve is increased to the first holding magnitude G1 from point t1 by mainly increasing the engine torque. In this situation, the speed ratio of the continuously variable transmission 4 is maintained to the current value or increased slightly. According to the conventional art, since the speed ratio is changed significantly over wide range after the commencement of the kick-downshifting, the acceleration of the vehicle is increased slowly due to the above-mentioned inertia moment. By contrast, according to the preferred embodiment, the speed ratio of the continuously variable transmission 4 is not increased significantly after the commencement of the kick-downshifting. According to the preferred embodiment, therefore, the inertial loss will not be caused significantly by the inertia moment of the continuously variable transmission 4, and hence the acceleration of the vehicle Ve can be increased sharply from point t1.

Then, the acceleration of the vehicle Ve is maintained at the first holding magnitude G1 for the duration of the first holding period T1. That is, the acceleration of the vehicle Ve is held at the first step during the first holding period T1 from point t1 to point t2. To this end, specifically, the first holding period T1 is determined in such a manner that the driver will not feel deteriorations in response to change in driving force and acceleration feel caused by holding the acceleration.

After the lapse of the first holding period T1, the acceleration of the vehicle Ve is again increased to the second holding magnitude G2, and held for the duration of the second holding period T2. That is, the acceleration of the vehicle Ve is held at the second step during the second holding period T2 from point t2 to point t3. The second holding period T2 is also determined in such a manner that the driver will not feel deteriorations in response to change in driving force and acceleration feel.

Figure 7:
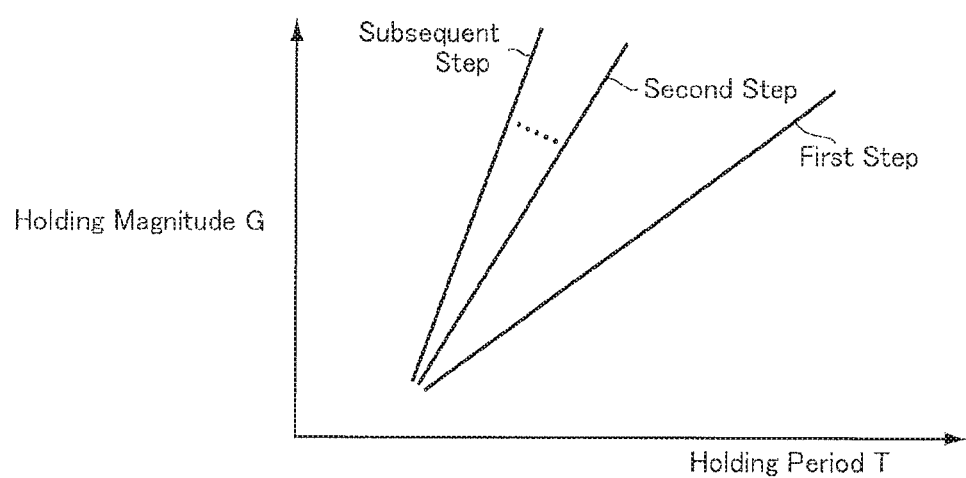
FIG. 7 is a graph indicating a difference in the relation between the holding period and the holding magnitude in the step after first step.

A time period that can hold an increase in the acceleration without being recognized by the driver is shorter after the first step. According to the example shown in FIG. 6, therefore, the second holding period T2 is set shorter than the first holding period T1. Specifically, as indicated in FIG. 7, an inclination of the diagonal line representing the relation between the holding period T and the holding magnitude G gets steeper after the first step. According to the preferred embodiment, therefore, the second holding period T2 is set shorter than the first holding period T1 in order not to deteriorate response to change in driving force and acceleration feel. That is, the first holding period T1 and the second holding period T2 are determined in such a manner as to improve response to change in driving force and acceleration feel.

After the lapse of the second holding period T2, the acceleration is further increased toward the final target acceleration from point t3 to point t4, and an upshifting is executed after point t4 in response to a rise in the engine speed.

Although the above exemplary embodiments of the present application have been described, it will be understood by those skilled in the art that the present application should not be limited to the described exemplary embodiments, and various changes and modifications can be made within the spirit and scope of the present application.

What is claimed is:

1. A vehicle control system for a vehicle having a continuously variable transmission for delivering an output power of a prime mover to a driveshaft, that is configured to detect an execution of a kick-down operation by a driver to increase an opening degree of an accelerator abruptly, and to control a speed ratio of the continuously variable transmission in such a manner as to achieve a required driving force based on the opening degree of the accelerator, comprising:
   a controller that is configured to control the output power and the speed ratio in such a manner that an actual driving force is increased stepwise to the required driving force to be achieved by the kick-down operation, so as to temporarily hold an increase in an acceleration during execution of the kick-down operation.

2. The vehicle control system as claimed in claim 1, wherein the controller is further configured to:
   increase the actual driving force stepwise in such a manner that the acceleration is held for a longer period of time from a point at which the acceleration is held, if the acceleration is held at a higher magnitude.

3. The vehicle control system as claimed in claim 1, wherein the controller is further configured to:
   select a pattern to increase the actual driving force stepwise from a plurality of patterns in such a manner that a total required time to achieve the required driving force by the kick-down operation is shortest.

4. The vehicle control system as claimed in claim 1, wherein the controller is further configured to:
   increase the actual driving force in at least two steps; and
   set a period of time to hold an increase in the acceleration at a step after a first step shorter than that at the first step.

* * * * *